(12) United States Patent
Jarmon

(10) Patent No.: US 8,453,456 B2
(45) Date of Patent: Jun. 4, 2013

(54) FUEL-COOLED FLEXIBLE HEAT EXCHANGER WITH THERMOELECTRIC DEVICE COMPRESSION

(75) Inventor: David C. Jarmon, Kensington, CT (US)

(73) Assignee: United Technologies Corporation, Hartford, CT (US)

( * ) Notice: Subject to any disclaimer, the term of this patent is extended or adjusted under 35 U.S.C. 154(b) by 974 days.

(21) Appl. No.: 12/550,106

(22) Filed: Aug. 28, 2009

(65) Prior Publication Data

US 2010/0242437 A1    Sep. 30, 2010

Related U.S. Application Data

(60) Provisional application No. 61/211,013, filed on Mar. 25, 2009.

(51) Int. Cl.
    *F02K 7/08*    (2006.01)

(52) U.S. Cl.
    USPC .............................................. 60/768; 60/267

(58) Field of Classification Search ............ 60/266, 60/267, 730, 767, 768, 801, 39.83; 244/53 R, 244/57–60; 62/3.2, 3.6, 3.61
    See application file for complete search history.

(56) References Cited

U.S. PATENT DOCUMENTS

| | | |
|---|---|---|
| 2,990,775 A | 7/1961 | Henson |
| 3,733,826 A | 5/1973 | Wolf et al. |
| 4,065,936 A | 1/1978 | Fenton et al. |
| 4,372,211 A | 2/1983 | Dante |
| 4,580,524 A | 4/1986 | Lackey, Jr. et al. |
| 5,135,184 A | 8/1992 | Billig |
| 5,337,975 A | 8/1994 | Peinemann |
| 5,584,183 A * | 12/1996 | Wright et al. .................... 62/3.7 |
| 5,874,775 A | 2/1999 | Shiomi et al. |
| 5,892,565 A | 4/1999 | Bass |
| 6,042,315 A | 3/2000 | Miller et al. |
| 6,045,310 A | 4/2000 | Miller et al. |
| 6,300,150 B1 | 10/2001 | Venkatasubramanian |
| 6,499,306 B2 | 12/2002 | Gillen |
| 6,627,019 B2 | 9/2003 | Jarmon et al. |

(Continued)

FOREIGN PATENT DOCUMENTS

| | | |
|---|---|---|
| EP | 1746257 A2 | 1/2007 |
| JP | 2004156827 A | 6/2004 |
| KR | 20030057985 A | 7/2003 |

OTHER PUBLICATIONS

R. F. Faulkner et al., "Hyrdrocarbon Scramjet Propulsion System Development, Demonstration and Application," AIAA 99-4922, American Institute of Aeronautics and Astronautics, Nov. 1-5, 1999 (pp. 1-8).

(Continued)

*Primary Examiner* — Phutthiwat Wongwian
*Assistant Examiner* — Scott Walthour
(74) *Attorney, Agent, or Firm* — Kinney & Lange, P.A.

(57) ABSTRACT

An apparatus includes a thermoelectric (TE) device, a gas flow conduit proximate to one side of the thermoelectric device, a plurality of flexible tubes proximate to a second side of the thermoelectric device, and a spring to control contact force between the flexible tubes and the thermoelectric device. The spring comprises a coil spring at least partially circumscribing the gas flow conduit. The thermoelectric device converts a temperature differential between the flexible tubes and the gas flow conduit into electrical energy.

23 Claims, 6 Drawing Sheets

U.S. PATENT DOCUMENTS

| | | |
|---|---|---|
| 6,894,215 B2 | 5/2005 | Akiba |
| 6,907,920 B2 | 6/2005 | Warburton et al. |
| 7,018,200 B2 | 3/2006 | Querejeta et al. |
| 7,210,653 B2 | 5/2007 | Atkey et al. |
| 7,254,953 B2 | 8/2007 | Callas et al. |
| 7,385,503 B1 | 6/2008 | Wells et al. |
| 2003/0234008 A1 | 12/2003 | Van Winkle |
| 2004/0045594 A1 | 3/2004 | Hightower |
| 2004/0124308 A1 | 7/2004 | Daggett |
| 2004/0134195 A1 | 7/2004 | Bouchez et al. |
| 2005/0022855 A1 | 2/2005 | Raver |
| 2006/0063522 A1 | 3/2006 | McFarland |
| 2006/0101822 A1 | 5/2006 | Murata |
| 2007/0018038 A1* | 1/2007 | Jarmon et al. .................. 244/59 |
| 2008/0083447 A1 | 4/2008 | Sienel |

OTHER PUBLICATIONS

R. Kazmer, "Hypersonic Propulsion at Pratt & Whitney—Overview," AIAA 2002-5144, American Institute of Aeronautics and Astronautics, 2002 (pp. 1-5).

W. Wong, "Advanced Radioisotope Power Conversion Technology Research and Development," NASA/TM-2004-213352, AIAA-2004-5515, Second Int'l Energy Conversion Engineering Conference, Dec. 2004 (12 pages).

J. J. Oswald et al., "Modeling and Evaluation of Canted Coil Springs as High Temperature Seal Preloading Devices," NASA/TM-2004-213189, AIAA-2004-3889, Sep. 2004 (16 pages).

* cited by examiner

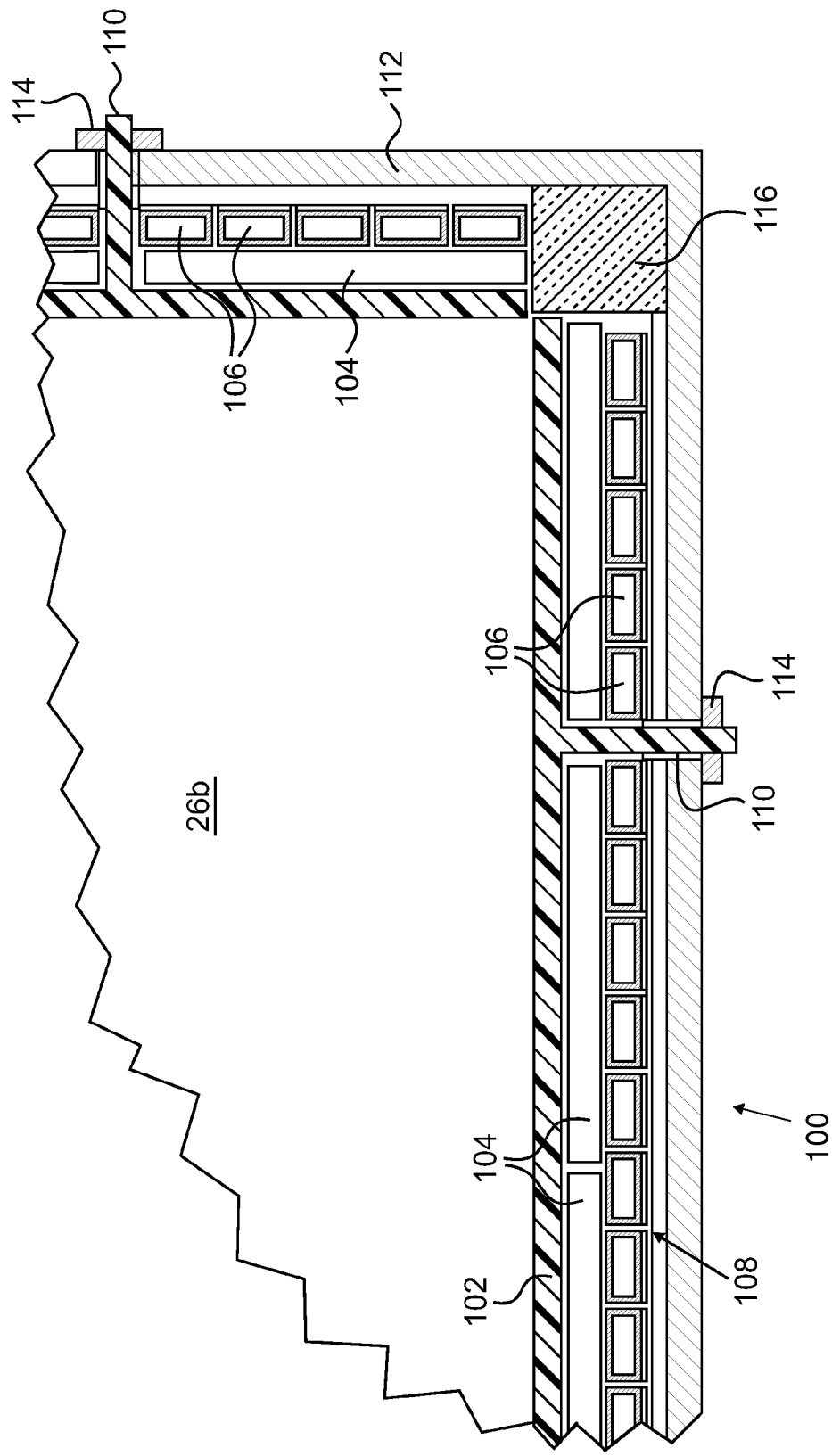

FUEL-COOLED FLEXIBLE HEAT EXCHANGER WITH THERMOELECTRIC DEVICE COMPRESSION

CROSS-REFERENCE TO RELATED APPLICATION(S)

The present application claims priority to U.S. Provisional Pat. App. Ser. No. 61/211,013 entitled FUEL-COOLED HEAT EXCHANGER WITH THERMOELECTRIC DEVICE COMPRESSION filed Mar. 25, 2009, which is hereby incorporated by reference in its entirety.

STATEMENT OF GOVERNMENT INTEREST

The Government may have certain rights in this invention pursuant to Contract No. FA8650-07-C-7721 awarded by the United States Air Force.

BACKGROUND

Hypersonic vehicles hold potential for future military application by shortening the time-to-target and thereby extending global reach. These vehicles are anticipated to be powered by scramjet (supersonic combustion ramjet) engines during hypersonic flight conditions. The structure which forms the hypersonic flow path in a scramjet engine is referred to in the art as a heat exchanger (HEX), which is a reference to the dual use of the flow conduit structure as a heat exchanger. Hypersonic HEXs are commonly fuel-cooled because air-cooling is not practical in hypersonic flight conditions. Fuel cooling also serves to preheat the combustion fuel, thereby adding energy to the fuel for combustion. In conventional jet engines, fuel pumps, on-board electric systems, and other accessory systems parasitically draw power from the engine's main power plant to function. However, unlike conventional jet engines, scramjet engines have no rotating mechanical elements. Hypersonic vehicles are therefore currently envisioned to rely on auxiliary power units (APUs) and/or batteries to meet the vehicle power requirements. However, both APUs and battery systems add significant weight, volume and system complexity.

SUMMARY

An apparatus according to the present invention includes a thermoelectric (TE) device, a gas flow conduit proximate to one side of the thermoelectric device, a plurality of flexible tubes proximate to a second side of the thermoelectric device, and a spring to control contact force between the flexible tubes and the thermoelectric device. The spring comprises a coil spring at least partially circumscribing the gas flow conduit. The thermoelectric device converts a temperature differential between the flexible tubes and the gas flow conduit into electrical energy.

BRIEF DESCRIPTION OF THE DRAWINGS

FIG. 5 is a schematic section view of a portion of an alternative heat exchanger.

DETAILED DESCRIPTION

Figure 1:
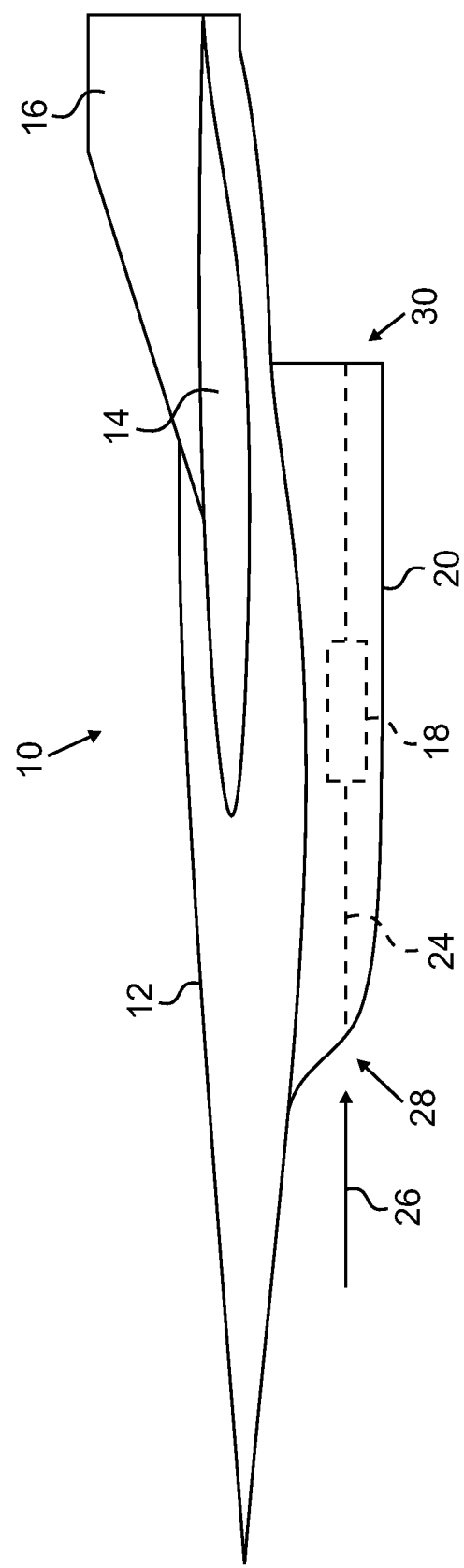
FIG. 1 is a schematic view of vehicle including hybrid gas turbine and ramjet engine.

FIG. 1 is a schematic view of vehicle 10 including fuselage 12, wing 14, tail assembly 16, engine 18, and cowl 20. Vehicle 10 may be, for example, a manned aircraft. Alternative vehicles may be unmanned and may be reusable or may be one-way vehicles (e.g., missiles or disposable launch vehicles). Although this description is made with reference to a vehicle, embodiments of the present invention are applicable to any platform that includes demanding thermal management and power generation needs. In FIG. 1, wing 14 and tail assembly 16 are supported by fuselage 12. Engine 18 is located in cowl 20 on an underside of fuselage 12. Air flow path 24 carries a flow 26 through engine 18 between a forward inlet/intake 28 and an aft outlet 30 (e.g., an exhaust nozzle).

Figure 2:
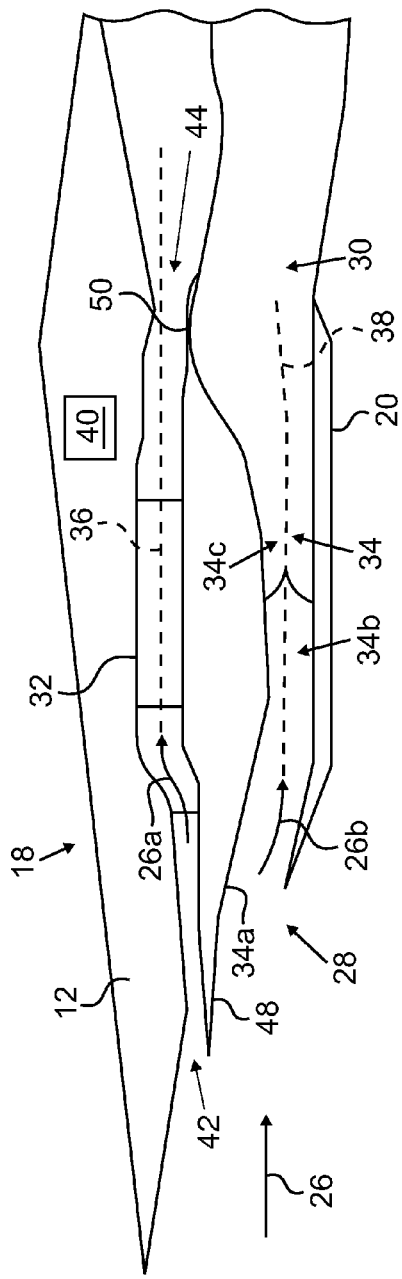
FIG. 2 is a schematic view of the hybrid gas turbine and ramjet engine of FIG. 1.

FIG. 2 is a schematic view of engine 18 located in cowl 20. Engine 18 includes gas turbine 32 and ramjet 34. An exemplary ramjet is a dual mode (i.e., subsonic and supersonic combustion) ramjet engine (i.e., a dual mode scramjet). A ramjet generally comprises a constricted tube through which inlet air is compressed by the high speed of the vehicle, a combustion chamber where fuel and compressed air are combusted, and a nozzle through which the exhaust jet leaves at higher speed than the inlet air, thereby generating thrust to power a vehicle in flight. There are few or no moving parts in a ramjet. In particular, there is no high-speed turbine, as in a turbofan or turbojet engine, that is expensive to produce and maintain. A ramjet requires airflow through the engine (in a scramjet the airflow must be supersonic), and therefore has a minimum functional speed. For example, in the hybrid vehicle shown in FIGS. 1-3, turbine 32 may be used to power vehicle 10 up to an appropriate speed beyond which ramjet 34 may augment or replace turbine 32 to power vehicle 10.

In FIG. 2, a portion 26a of air flow 26 can be directed along flow path 36 into turbine 32, while another portion 26b of flow 26 can be directed along flow path 38 into ramjet 34. Flow path 38 carries a flow 26b through ramjet 34 between forward inlet/intake 28 and aft outlet 30. Along flow path 26b, ramjet 34 may include a forebody 34a, an isolator 34b (often integrated therewith), and a combustor 34c. During operation, air is scooped into ramjet 34 through forebody 34a and compressed along isolator 34b before entering combustor 34c. The compressed air is mixed with fuel in combustor 34c and ignited. The products of combustion are exhausted through outlet 30 to produce useful thrust used to power vehicle 10 in flight. As shown in FIG. 2, engine 18 may also include control system 40 configured to control operation of combustor 34c in response to one or more of sensor input, operator input, and the like. Control system 40 may optionally be included as a portion of the avionics of vehicle 10.

Gas turbine 32 is located along air flow path 36 carrying flow 26a between a forward inlet/intake 42 and an aft outlet 44 inboard of ramjet flow path 26b (e.g., partially recessed into fuselage 12 above cowl 20). Ramjet and turbine inlet flaps 46 and 48, respectively, can selectively block ramjet and turbine inlets 28, 42 and flow paths 38, 36 when ramjet 34 or turbine 32, respectively, is not in operation. Similarly, turbine outlet flap 50 may selectively block turbine flow path 36 when turbine 32 is not in use so as to provide an efficient nozzle for ramjet 34.

Figure 3:
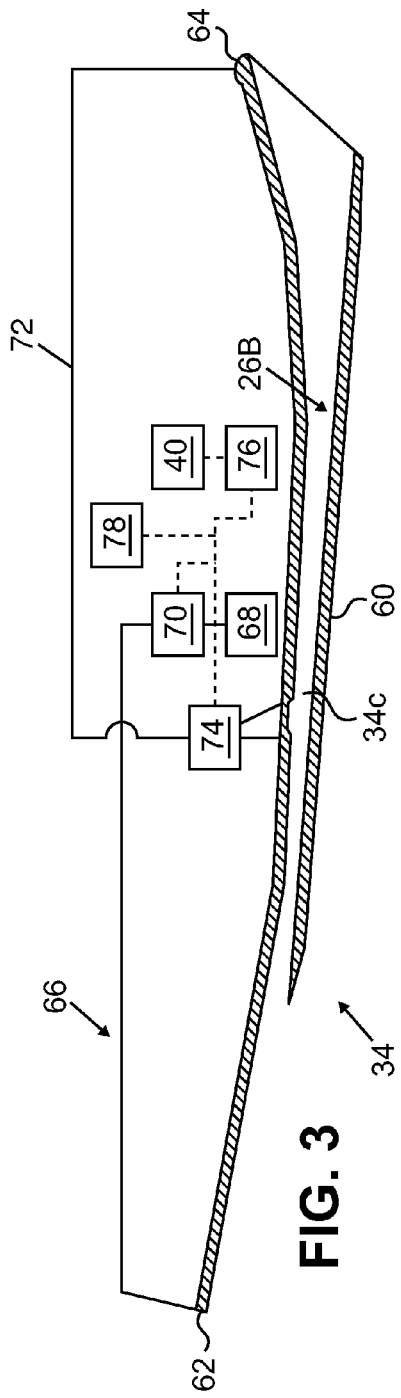
FIG. 3 is a schematic axial section view of the ramjet of FIG. 2 including a fuel-cooled heat exchanger.

FIG. 3 is a schematic axial section view showing further details of the ramjet engine 34 and flow 26b. At least a portion of flow 26b is largely surrounded by heat exchanger (or conduit assembly) 60 for transferring heat from the air and combustion gases in ramjet 34 to pre-combustion ramjet fuel. A radially inward face of heat exchanger (or HEX) 60 forms a gas flow conduit through which flow 26b of ramjet 34 passes. Heat exchanger 60 can be formed as a generally rectangular conduit surrounding flow 26b, sometimes referred to as a 2-D configuration, or as an annular conduit circumscribing flow 26b, sometimes referred to as a 3-D configuration. For an exemplary hydrocarbon-based fuel, heat exchanger 60 is a liquid-fuel-cooled heat exchanger. An alternative fuel used to cool heat exchanger 60 is a hydrogen gas. Heat exchanger 60 can have an upstream fuel inlet 62 and a downstream fuel outlet 64. In the illustrated embodiment, the inlet 62 is upstream of combustor 34c along flow path 26b. Heat exchanger 60 can thereby be used to pre-heat the fuel used in combustor 34c using the hot air and fuel mixture exiting combustor 34c. Fuel flow 66 of ramjet 34 can extend from storage tank 68 to fuel pump 70 and then to inlet 62. After exiting outlet 64, heated fuel may pass along flow path 72 to a fuel distribution valve network 74 and then to combustor 34c. The valves of network 74 distribute the fuel to various combustor locations for various purposes (e.g., piloting v. main combustion) and to achieve desired staging.

In addition to pre-heating combustion fuel, heat exchanger 60 thermoelectrically generates electricity. Accordingly, exchanger 60 can be coupled to an electrical power conditioning, storage, and distribution system, such as system 76 shown schematically in FIG. 3. System 76 can receive raw electrical input from heat exchanger 60 and output appropriate electricity (e.g., of a constant and proper voltage) to drive, for example, control system 40, fuel pump 70, distribution valves of the network 74, similar components associated with turbine 32, and additional loads schematically shown as 78.

Figure 4A:
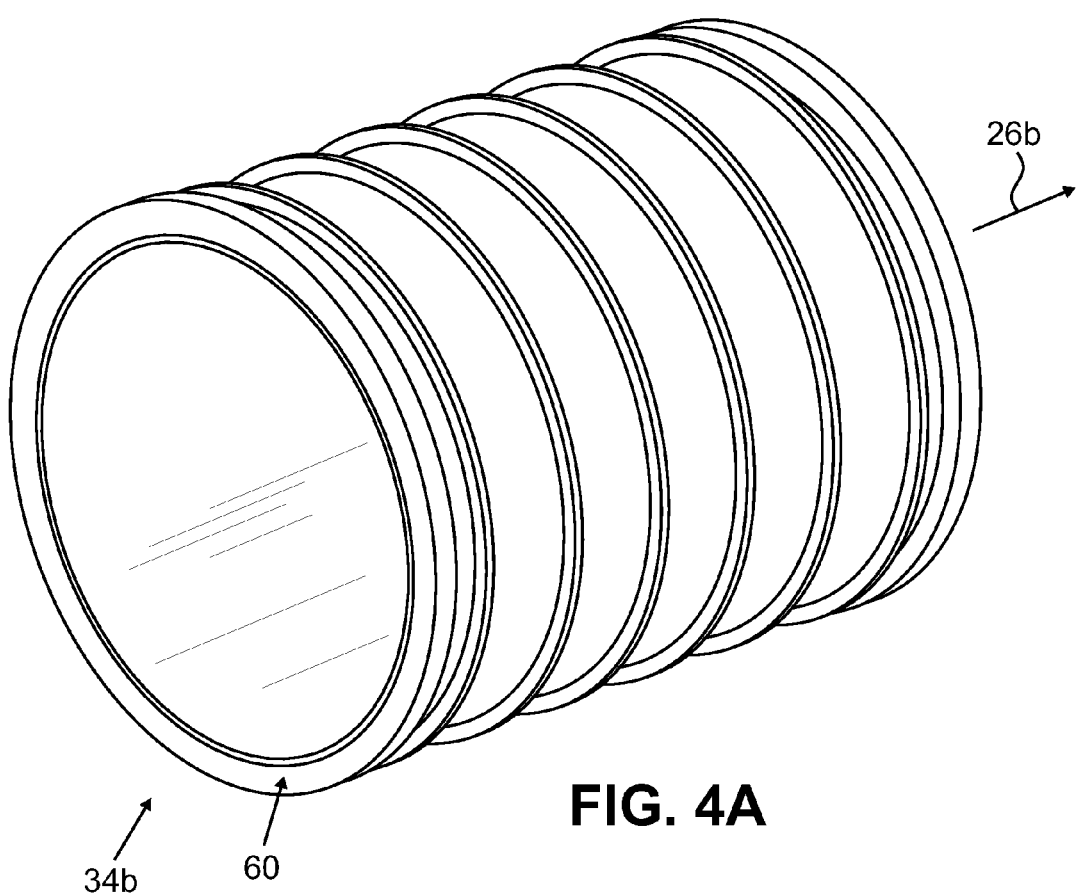
FIGS. 4A-4C show details of the isolator section of ramjet of FIG. 2 including a portion of the heat exchanger of FIG. 3.
Figure 4B:
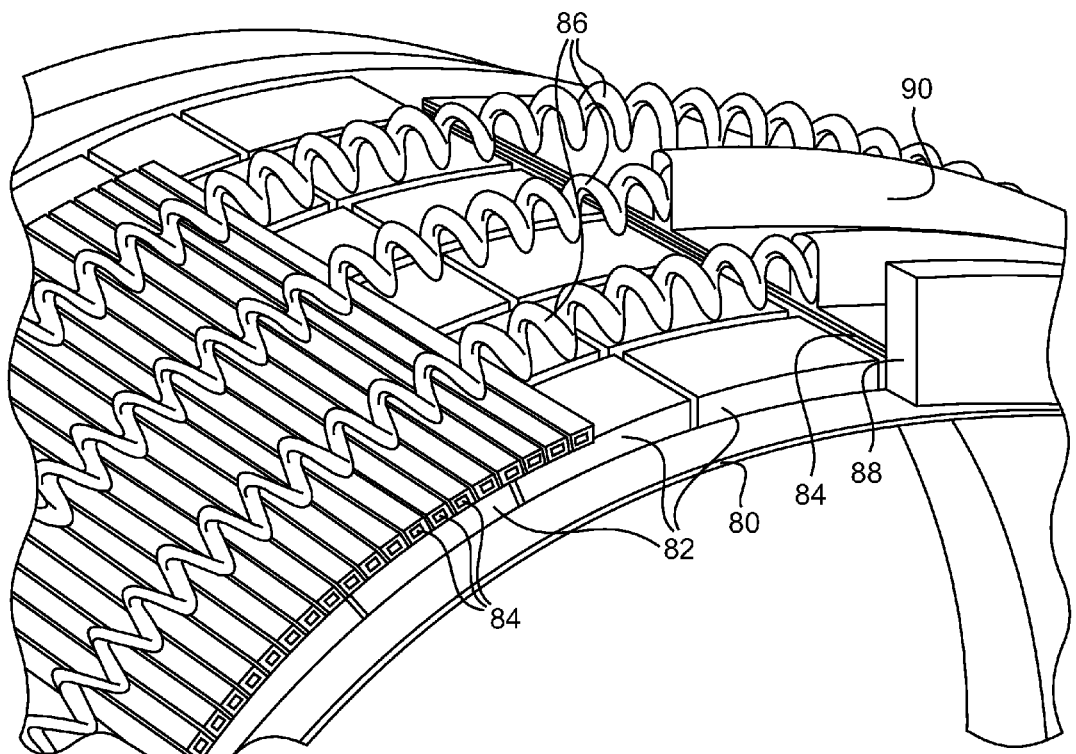
Figure 4C:
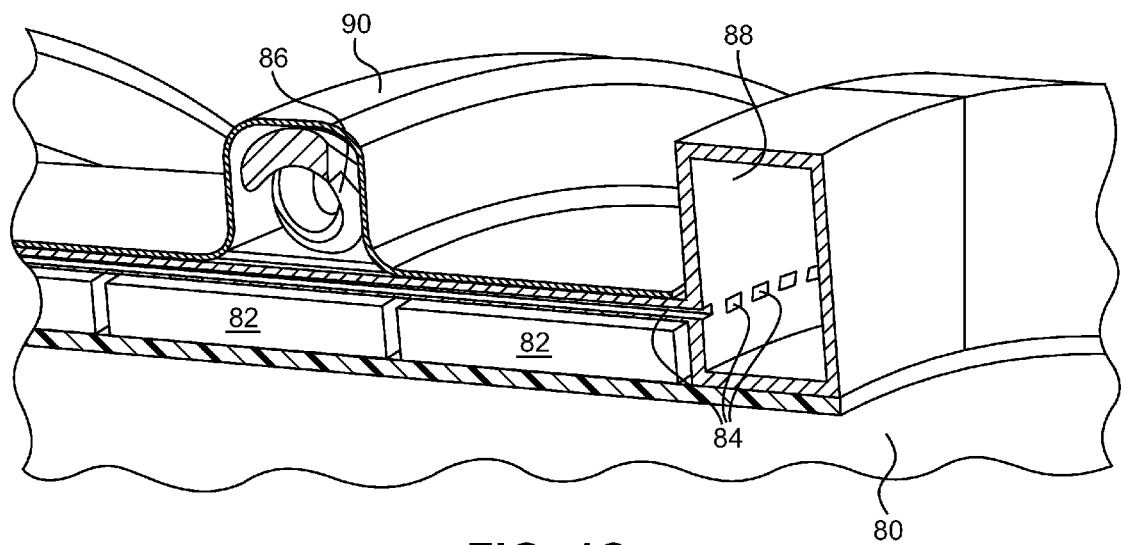

FIGS. 4A-4C show details of a portion of ramjet 34, including isolator 34b and a portion of heat exchanger 60. FIG. 4A is a perspective view of isolator 34b including heat exchanger 60. FIGS. 4B and 4C are cut-away perspective views showing details of heat exchanger 60. Heat exchanger 60 includes gas flow conduit 80, thermoelectric (TE) devices 82, fuel-cooled tubes 84, one or more springs 86, manifolds 88, and casing 90. In FIGS. 4A-4C, gas flow conduit 80 surrounds a gas flow, such as flow 26b shown in FIGS. 2 and 3, and is formed as annular or 3-D type conduit. In order to withstand the extreme operating temperatures of hypersonic flight, gas flow conduit 80 can be manufactured from, for example, high temperature alloys or ceramics, or a ceramic matrix composite (CMC). CMC is approximately one third the density of metal and therefore provides a significant weight savings over a metal conduit. In some applications, a metal may tend to overheat because TE devices 82 act as a thermal insulator between the material of conduit 80 and fuel-cooled tubes 84. CMC can operate at higher temperatures than metal, which makes it less likely to overheat in such applications. The CMC material, as well as other components of the heat exchanger 60, can optionally include suitable coatings as desired for particular applications. Conduit 80 is arranged between the gas flow and TE devices 82. Adjacent to (e.g., radially outward from) TE devices 82 are fuel-cooled tubes 84. TE devices 82 are therefore arranged between the relatively hot gas flow conduit 80 and the relatively cool fuel-cooled tubes 84, to enable generation of electricity from the thermal differential therebetween. Individual fuel-cooled tubes allow an opening through which electrical leads for TE devices 82 can pass, which facilitates assembly of heat exchanger 60.

Generally speaking, TE devices produce a voltage in the presence of a temperature difference between two different electrically conductive materials. The voltage causes a continuous electrical current to flow in the conductors if they form a complete loop. The electrical current generated may be used to, for example, power accessory systems on an aircraft as discussed with reference to FIG. 3 above. TE devices function best with optimal thermal contact, and thereby thermal conduction, between the TE device and, for example, a gas flow conduit of a fuel-cooled heat exchanger. However, manufacturing and assembly tolerances, variations in position and size in components during operation, and other factors may degrade contact between the TE device and the conduit. Therefore, embodiments of the present invention employ one or more springs 86 to bias TE devices 82 into contact with the relatively hot gas flow conduit 80 and the relatively cool fuel-cooled tubes 84 between which the TE devices 82 are arranged. The load placed on TE devices 82 by the springs 86, directly or indirectly, helps ensure substantially continuous physical contact, while remaining below the structural limits of TE devices 82. For example, a functional range for TE devices 82 used in embodiments of the present invention is approximately 140 to 350 kPa (20 to 50 psi).

In practice, TE devices 82 exhibit dimensional variations caused by both manufacturing tolerances and operational effects, e.g. thermal expansion during flight. For instance, dimensional variations in TE devices 82 may adversely affect thermal conduction by varying the amount of contact between fuel-cooled tubes 84 and TE devices 82 over which tubes 84 are arranged. Embodiments of the present invention therefore employ individual flexible fuel-cooled tubes 84, as opposed to, for example, sets of multiple interconnected rigid tubes, that can better accommodate dimensional variations in TE devices 82. Furthermore, the individual fuel-cooled tubes 84 can have a width dimension that is smaller that a corresponding dimension of each TE device 82, thereby allowing for compensation in dimensions across a single TE device 82.

In FIGS. 4A-4C, gas flow conduit 80 has an annular, generally cylindrical shape through which gas flow 26b can pass. In the illustrated embodiment, conduit 80 provides primary structural support for heat exchanger 60. Conduit 80 is surrounded by TE devices 82, which are in turn surrounded by fuel-cooled tubes 84. As shown in FIGS. 4B and 4C, heat exchanger 60 can include many individual TE devices 82 and fuel-cooled tubes 84 arranged in combination to substantially cover gas flow conduit 80. In the illustrated embodiment, fuel-cooled tubes 84 extend generally axially from a first to a second end of the isolator 34b section of heat exchanger 60. The first and second ends of fuel-cooled tubes 84 are each fluidically connected to one of two annular manifolds 88, which are configured to carry pre-combustion fuel to and from tubes 84. Fuel-cooled tubes 84 can be arranged substantially perpendicular to each manifold 88, and can have a substantially rectangular cross-sectional profile to provide increased surface area exposure for thermal energy transfer. Manifolds can each have a substantially rectangular cross-sectional profile. Fuel-cooled tubes 84 are flexible, in part, because they are individual tubes with a high length to width ratio. Thermo-structural analysis predicts that a wall thickness of 0.38 mm (0.015 inches) will be sufficient for tubes 84 made of INCONEL alloy (available from Special Metals Corporation, Huntington, West Va.) at 6.9 MPa (1 ksi) internal pressure operating in a temperature range of approximately 20-650° C. (68-1202° F.) which are typical of the conditions in a hypersonic HEX application.

At least partially circumscribing gas flow conduit 80, TE devices 82, and fuel-cooled tubes 84 are one or more springs 86 spaced from one another. In the illustrated embodiment, the springs 86 extend circumferentially to at least partially circumscribe the flow path 26b, and are axially spaced from one another. Casing 90 encases and helps compress springs 86 in order to help keep TE devices 82 in contact with fuel-cooled tubes 84 and gas flow conduit 80. In that way, inwardly-directed compressive loading is provided. Controlled pressure can be applied to the back of each individual fuel-cooled tube 84 by springs 86, which are in compression between tubes 84 and casing 90. Canted coil springs can be selected for the springs 86, as shown in the illustrated embodiment, because they can provide a relatively constant load over a large displacement. A relatively constant load over a large displacement reduces a risk of overloading the TE devices as dimensional variations in the heat exchanger occur during operation. Custom designed Canted-Coil™ springs suitable for use as springs 86 are available from Bal Seal Engineering, Inc. of Foothill Ranch, Calif.

Casing 90 can be made of a metallic material. In the illustrated embodiment, casing 90 has a generally corrugated configuration that defines circumferentially-extending channels to accommodate springs 86.

Embodiments of the present invention can also be applied to a 2-D type heat exchanger application as shown in FIG. 5, which is a schematic section view of a portion of alternative heat exchanger 100 including gas flow conduit 102, thermoelectric (TE) devices 104, fuel-cooled tubes 106, one or more springs 108 (e.g., canted coil springs), supports 110, casing 112, fasteners 114, and insulation 116. As shown in FIG. 5, gas flow conduit 102 surrounds a gas flow path and is formed as a 2-D conduit, i.e., a conduit with a generally rectangular cross-section. In order to withstand the extreme operating temperatures of hypersonic flight, gas flow conduit 102 can be manufactured from, for example, high temperature alloys or ceramics, or a CMC material. Conduit 102 is arranged between gas flow path 26b and TE devices 104. Adjacent to (e.g., radially outward from) TE devices 104 are fuel-cooled tubes 106. TE devices 104 are therefore arranged between the relatively hot gas flow conduit 102 and the relatively cool fuel-cooled tubes 106 to enable generation of electricity from a thermal differential therebetween. Supports 110 extend between casing 112 and gas flow conduit 102. Springs 108 are arranged between fuel-cooled tubes 106 and casing 112. Casing 112 is attached to supports 110 by fasteners 114, which are configured to help compress springs 108 against fuel-cooled tubes 106 to bring TE devices 104 into contact with fuel-cooled tubes 106 and gas flow conduit 102. In that way an inwardly-directed compressive force is provided. At corners of heat exchanger 100, insulation 116 can be provided to form a junction between banks of TE devices 104, fuel-cooled tubes 106, and springs 108 that are arranged generally perpendicular to each other. It should be noted that as used herein, springs 108 are described as circumscribing the flow path 26b in the embodiment of FIG. 6, even though springs 108 do not have a circular arrangement.

Those of ordinary skill in the art will recognize that embodiments of the present invention provide numerous advantages over prior heat exchangers employing TE devices. For example, heat exchangers according to the present invention help increase thermal conduction of the TE device by employing one or more generally circumferentially extending coil springs to bias the TE device into contact with the hot gas flow conduit and the cool fuel-cooled tubes between which the TE device is arranged. The load placed on the TE device by the springs is sufficient to ensure substantially continuous physical contact, while remaining below the structural limits of the TE device. Dimensional variations in the TE devices can be tolerated with the present invention because a width of the individually loaded fuel-cooled tubes can be significantly smaller than a corresponding width of the TE devices and therefore the pressure load will dynamically adjust to dimensional changes. The coil springs and flexible fuel-cooled tubes employed in embodiments of the present invention can also accommodate differential thermal growth between the various components in both steady state and transient conditions. Assembly time and manufacturing complexity is also relatively low.

Embodiments of the present invention employing the annular or 3-D type configuration have additional benefits. Weight, complexity, and part count are reduced by employing a sealed casing that can help reduce or eliminate a need for fastener hardware, which can provide a weight savings of approximately 4 kg/m² according to inventor calculations. Furthermore, in prior art heat exchangers TE devices can suffer from oxidative degradation. With the present invention, the flow of oxidizing gases around the TE devices can be minimized by sealing them between the continuous gas flow conduit and the casing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, the present invention can be utilized with a variety of types of engines for electrical power generation. Moreover, the springs of the heat exchanger can be arranged in a helical pattern.

The invention claimed is:

1. An apparatus comprising:
a thermoelectric (TE) device;
a combustion gas flow conduit proximate to one side of the thermoelectric device;
a plurality of flexible tubes proximate to a second side of the thermoelectric device; and
a spring to control contact force between the flexible tubes and the thermoelectric device, wherein the spring comprises a coil spring circumscribing the combustion gas flow conduit;
wherein the thermoelectric device converts a temperature differential between the flexible tubes and the combustion gas flow conduit into electrical energy.

2. The apparatus of claim 1 wherein a fuel flows through the flexible tubes and thereby cools the flexible tubes.

3. The apparatus of claim 1 wherein the combustion gas flow conduit further comprises a ceramic matrix composite.

4. The apparatus of claim 1,
wherein the combustion gas flow conduit is formed in a generally annular shape; and
wherein the coil spring is arranged substantially circumferentially with respect to the combustion gas flow conduit.

5. The apparatus of claim 4,
wherein each of the flexible tubes extends between a first and a second end of the combustion gas flow conduit; and
wherein at least one of the first and the second ends of each of the flexible tubes is connected to an annular manifold configured to carry a fluid.

6. The apparatus of claim 1,
wherein the combustion gas flow conduit is formed in a generally rectangular cross-sectional shape, and wherein the spring substantially surrounds the flexible fuel-cooled tubes.

7. The apparatus of claim 1,
wherein each of the flexible tubes extends between a first and a second end of the combustion gas flow conduit; and
wherein at least one of the first and the second ends of each of the flexible tubes is connected to a manifold configured to carry a fluid.

8. The apparatus of claim 1, wherein the spring is configured to apply a load on the TE device of approximately 140 to 350 kPa (20 to 50 psi).

9. The apparatus of claim 1, wherein the spring is a canted coil spring.

10. A ramjet comprising:
a conduit assembly surrounding a gas flow path of the ramjet, the conduit assembly comprising:
a gas flow conduit arranged adjacent the gas flow path;
a plurality of flexible tubes configured to be cooled by a fuel flowable therethrough;
a thermoelectric (TE) device, for converting a thermal energy differential into electrical energy, arranged between the gas flow conduit and the flexible tubes; and
a coil spring configured to bias the TE device into contact with the gas flow conduit and the flexible tubes, wherein the coil spring at least partially circumscribes the gas flow path;
a combustor arranged aftward of the conduit assembly; and
an outlet conduit arranged aftward of the combustor.

11. The ramjet of claim 10,
wherein the gas flow conduit, the TE device, and the flexible tubes are formed in a generally annular shape in a direction substantially perpendicular to the gas flow path; and
wherein the coil spring is arranged substantially circumferentially with respect to the gas flow path.

12. The ramjet of claim 10,
wherein each of the flexible tubes extends between a first and a second end of the conduit; and
wherein one or both of the first and the second ends of each of the flexible tubes is connected to an annular manifold configured to carry the fuel.

13. The ramjet of claim 10, wherein the gas flow conduit comprises a ceramic matrix composite material.

14. The ramjet of claim 13,
wherein the gas flow conduit, the TE device, and the flexible tubes are formed in a generally rectangular cross-sectional shape in a direction substantially perpendicular to the gas flow path;

wherein the coil spring substantially surrounds the flexible tubes;
wherein each of the flexible tubes extends between a first and a second end of the conduit; and
wherein one or both of the first and the second ends of each of the flexible tubes is connected to a manifold configured to carry the fuel.

15. The ramjet of claim 10, wherein the coil spring is configured to apply a load on the TE device of approximately 140 to 350 kPa (20 to 50 psi).

16. The ramjet of claim 10, wherein the coil spring is a canted coil spring.

17. The ramjet of claim 10 and further comprising one or more additional coil springs spaced apart from one another.

18. A vehicle comprising:
a fuselage; and
an engine connected to the fuselage and comprising a conduit assembly surrounding a gas flow path of the engine, wherein the conduit assembly comprises:
a gas flow conduit arranged adjacent the gas flow path;
a plurality of flexible tubes configured to be cooled by a fuel flowable therethrough;
a manifold connected in fluid communication with each of the plurality of flexible tubes;
a thermoelectric (TE) device configured to convert a thermal differential into electrical energy and arranged between the gas flow conduit and the flexible tubes; and
a canted coil spring configured to circumscribe the gas flow path and bias the TE device into contact with the gas flow conduit and the flexible tubes.

19. The vehicle of claim 18, wherein the gas flow conduit comprises a ceramic matrix composite material.

20. The vehicle of claim 18,
wherein each of the flexible tubes extends between a first and a second end of the pas flow conduit; and
wherein the manifold is annular in shape.

21. The vehicle of claim 18, wherein the gas flow conduit, the TE device, and the flexible fuel-cooled tubes are formed in a generally rectangular cross-sectional shape in a direction substantially perpendicular to the gas flow path.

22. The vehicle of claim 18, wherein the canted coil spring is configured to apply a load on the TE device of approximately 140 to 350 kPa (20 to 50 psi).

23. The vehicle of claim 18 and further comprising one or more additional canted coil springs axially spaced from one another.

* * * * *

UNITED STATES PATENT AND TRADEMARK OFFICE
CERTIFICATE OF CORRECTION

PATENT NO.       : 8,453,456 B2
APPLICATION NO.  : 12/550106
DATED            : June 4, 2013
INVENTOR(S)      : David C. Jarmon Page 1 of 1

It is certified that error appears in the above-identified patent and that said Letters Patent is hereby corrected as shown below:

In the Claims

Col. 8, Line 37, Claim 20
  Delete "pas"
  Insert --gas--

Signed and Sealed this
Twelfth Day of November, 2013

Teresa Stanek Rea
*Deputy Director of the United States Patent and Trademark Office*